United States Patent
Kim et al.

(10) Patent No.: US 11,005,624 B2
(45) Date of Patent: May 11, 2021

(54) BEAM CONTROL METHOD FOR DIRECT COMMUNICATION BETWEEN TERMINALS IN WIRELESS COMMUNICATION SYSTEM, AND DEVICE THEREFOR

(71) Applicant: LG ELECTRONICS INC., Seoul (KR)

(72) Inventors: Heejin Kim, Seoul (KR); Youngtae Kim, Seoul (KR); Hanbyul Seo, Seoul (KR); Hyukjin Chae, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/479,332

(22) PCT Filed: Jan. 18, 2018

(86) PCT No.: PCT/KR2018/000824
§ 371 (c)(1),
(2) Date: Jul. 19, 2019

(87) PCT Pub. No.: WO2018/135867
PCT Pub. Date: Jul. 26, 2018

(65) Prior Publication Data
US 2019/0342047 A1    Nov. 7, 2019

Related U.S. Application Data

(60) Provisional application No. 62/448,395, filed on Jan. 20, 2017.

(51) Int. Cl.
*H04L 5/00* (2006.01)
*H04W 72/04* (2009.01)
*H04W 92/18* (2009.01)

(52) U.S. Cl.
CPC ......... *H04L 5/0048* (2013.01); *H04W 72/046* (2013.01); *H04W 72/0406* (2013.01); *H04W 92/18* (2013.01)

(58) Field of Classification Search
CPC .... H04L 5/0048; H04W 92/18; H04W 72/046
See application file for complete search history.

(56) References Cited

U.S. PATENT DOCUMENTS

| | | | | |
|---|---|---|---|---|
| 2010/0008282 A1* | 1/2010 | Bhattad | ................ | H04J 11/0069 370/312 |
| 2013/0039345 A1* | 2/2013 | Kim | .................... | H04W 72/042 370/332 |

(Continued)

FOREIGN PATENT DOCUMENTS

| | | |
|---|---|---|
| EP | 1615365 A1 | 1/2006 |
| JP | 2015185952 A | 10/2015 |

(Continued)

OTHER PUBLICATIONS

R1-1700134—3GPP TSG RAN WG1 NR Ad-Hoc Meeting, Spokane, USA, Jan. 16-20, 2017, ZTE, ZTE Microelectronics, "On CSI-RS for beam management" (7 Pages).

(Continued)

*Primary Examiner* — Jamal Javaid
(74) *Attorney, Agent, or Firm* — Dentons US LLP

(57) ABSTRACT

The present application discloses a method for a terminal to transmit data to another terminal in a wireless communication system by using direct communication between the terminals. Particularly, the method comprises: a step of transmitting, to another terminal, a data signal and a plurality of reference signals corresponding to a plurality of transmission beams, on a frame configured with one or more data symbols and one or more reference signal symbols; a step of receiving, from the another terminal, a negative response to the data signal, and information on a reference signal corresponding to at least one preferred transmission beam among the plurality of transmission beams; and a step of re-transmitting, to the another terminal, the data signal which has been precoded based on the preferred transmis- (Continued)

sion beam, wherein the plurality of reference signals are time-division multiplexed within one reference signal symbol.

10 Claims, 12 Drawing Sheets

(56) References Cited

U.S. PATENT DOCUMENTS

| | | |
|---|---|---|
| 2014/0177607 A1 | 6/2014 | Li et al. |
| 2014/0185495 A1* | 7/2014 | Kuchibhotla ......... H04L 5/0094 370/281 |

FOREIGN PATENT DOCUMENTS

| | | |
|---|---|---|
| KR | 10-2014-0129147 A | 11/2014 |
| KR | 10-2015-0100653 A | 9/2015 |
| KR | 10-2016-0005003 A | 1/2016 |
| KR | 10-2016-0055072 A | 5/2016 |
| WO | 2010098147 A1 | 9/2010 |
| WO | 2016060177 A1 | 4/2016 |

OTHER PUBLICATIONS

Watanabe, Obana et al., Design and Evaluation for Ad Hoc Testbed Using a Practice Smart Antenna Based on Wireless LAN, Information Processing Society of Japan, Aug. 25, 2020, Advanced Traffic System, Mobile Communication System, Journal of the Information Processing Society of Japan and Japan Which Bring about Watanabe, Mashahiro and Next-Generational Infrastructure, 49th Volume, No. 1, pp. 288-299. (12 Pages).

* cited by examiner

FIG. 2
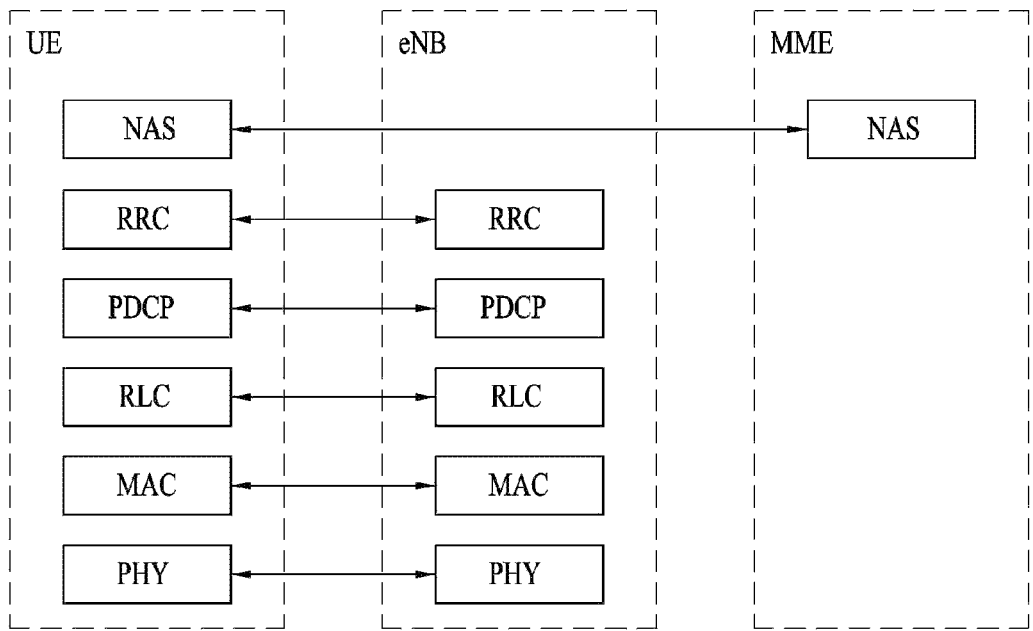
(a) Control-plane protocol stack
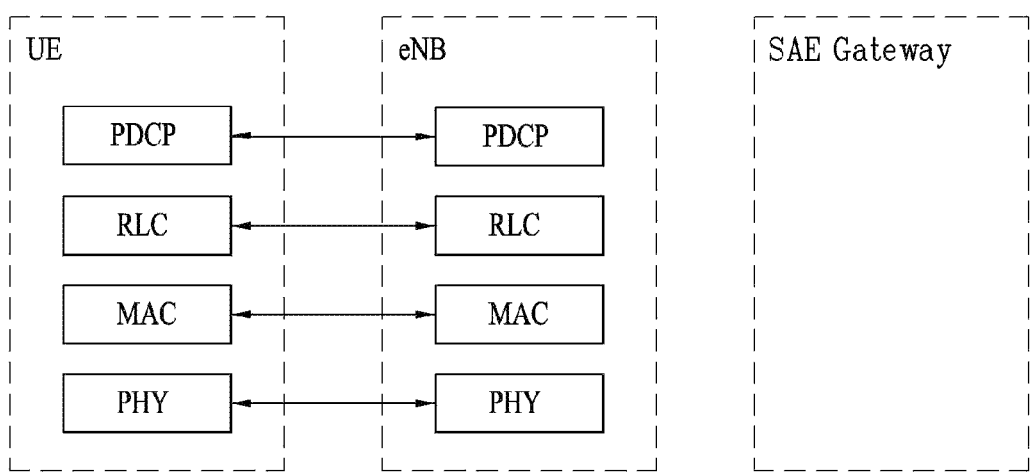
(b) User-plane protocol stack

BEAM CONTROL METHOD FOR DIRECT COMMUNICATION BETWEEN TERMINALS IN WIRELESS COMMUNICATION SYSTEM, AND DEVICE THEREFOR

This application is the National Phase of PCT International Application No. PCT/KR2018/000824, filed on 18 Jan. 2018, which claims priority under 35 U.S.C. 119(e) to U.S. Provisional Application No. 62/448,395 filed on 20 Jan. 2017 which is hereby incorporated by reference herein in their entirety.

TECHNICAL FIELD

The present disclosure relates to a wireless communication system, and more particularly, to a method and apparatus for beam control for direct communication between user equipments (UEs) in a wireless communication system.

BACKGROUND ART

3GPP LTE (3rd generation partnership project long term evolution hereinafter abbreviated LTE) communication system is schematically explained as an example of a wireless communication system to which the present invention is applicable.

FIG. 1 is a schematic diagram of E-UMTS network structure as one example of a wireless communication system. E-UMTS (evolved universal mobile telecommunications system) is a system evolved from a conventional UMTS (universal mobile telecommunications system). Currently, basic standardization works for the E-UMTS are in progress by 3GPP. E-UMTS is called LTE system in general. Detailed contents for the technical specifications of UMTS and E-UMTS refers to release 7 and release 8 of "3rd generation partnership project; technical specification group radio access network", respectively.

Referring to FIG. 1, E-UMTS includes a user equipment (UE), an eNode B (eNB), and an access gateway (hereinafter abbreviated AG) connected to an external network in a manner of being situated at the end of a network (E-UTRAN). The eNode B may be able to simultaneously transmit multi data streams for a broadcast service, a multicast service and/or a unicast service.

One eNode B contains at least one cell. The cell provides a downlink transmission service or an uplink transmission service to a plurality of user equipments by being set to one of 1.25 MHz, 2.5 MHz, 5 MHz, 10 MHz, 15 MHz, and 20 MHz of bandwidths. Different cells can be configured to provide corresponding bandwidths, respectively. An eNode B controls data transmissions/receptions to/from a plurality of the user equipments. For a downlink (hereinafter abbreviated DL) data, the eNode B informs a corresponding user equipment of time/frequency region on which data is transmitted, coding, data size, HARQ (hybrid automatic repeat and request) related information and the like by transmitting DL scheduling information. And, for an uplink (hereinafter abbreviated UL) data, the eNode B informs a corresponding user equipment of time/frequency region usable by the corresponding user equipment, coding, data size, HARQ-related information and the like by transmitting UL scheduling information to the corresponding user equipment. Interfaces for user-traffic transmission or control traffic transmission may be used between eNode Bs. A core network (CN) consists of an AG (access gateway) and a network node for user registration of a user equipment and the like. The AG manages a mobility of the user equipment by a unit of TA (tracking area) consisting of a plurality of cells.

Wireless communication technologies have been developed up to LTE based on WCDMA. Yet, the ongoing demands and expectations of users and service providers are consistently increasing. Moreover, since different kinds of radio access technologies are continuously developed, a new technological evolution is required to have a future competitiveness. Cost reduction per bit, service availability increase, flexible frequency band use, simple structure/open interface and reasonable power consumption of user equipment and the like are required for the future competitiveness.

DISCLOSURE

Technical Problem

An aspect of the present disclosure is to provide a method and apparatus for beam control for direct communication between user equipments (UEs) in a wireless communication system, based on the above description.

Technical Solution

In an aspect of the present disclosure, a method of transmitting data to a peer user equipment (UE) through direct communication between UEs by a UE in a wireless communication system includes transmitting, to the peer UE, a data signal and a plurality of reference signals corresponding to a plurality of transmission beams in a frame including one or more data symbols and one or more reference signal symbols, receiving, from the peer UE, a negative acknowledgment (NACK) for the data signal and information about a reference signal corresponding to at least one preferred transmission beam among the plurality of transmission beams, and retransmitting, to the peer UE, the data signal by precoding the data signal based on the preferred transmission beam. The plurality of reference signals are multiplexed in time division multiplexing (TDM) in one reference signal symbol.

In an aspect of the present disclosure, a method of receiving data from a peer UE through direct communication between UEs by a UE in a wireless communication system includes receiving, from the peer UE, a data signal and a plurality of reference signals corresponding to a plurality of transmission beams in a frame including one or more data symbols and one or more reference signal symbols, transmitting, to the peer UE, a NACK for the data signal and information about a reference signal corresponding to at least one preferred transmission beam among the plurality of transmission beams, and receiving, from the peer UE, the data signal precoded and retransmitted based on the preferred transmission beam. The plurality of reference signals are multiplexed in TDM in one reference signal symbol.

The plurality of reference signals may be multiplexed in TDM sequentially in order of antenna port indexes in one reference signal symbol.

The data signal and the plurality of reference signals may be multicast to the peer UE and one or more other UEs.

The plurality of reference signals may be transmitted through different antenna ports. Precoders applied to the plurality of reference signals may be different from a precoder applied to the data signal.

Further, the at least one preferred transmission beam may be selected from a beam candidate set including one or more of the plurality of transmission beams, and the beam candidate set may be determined based on proximity between the UE and the peer UE.

Advantageous Effects

According to the embodiments of the present disclosure, transmission beam control and reception beam control may be performed more efficiently for direct communication between user equipments (UEs).

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

FIG. 2 is a diagram illustrating structures of a control plane and a user plane of a radio interface protocol between a user equipment (UE) and an evolved UMTS radio access network (E-UTRAN) based on the 3GPP radio access network specification.

BEST MODE FOR CARRYING OUT THE INVENTION

Figure 1:
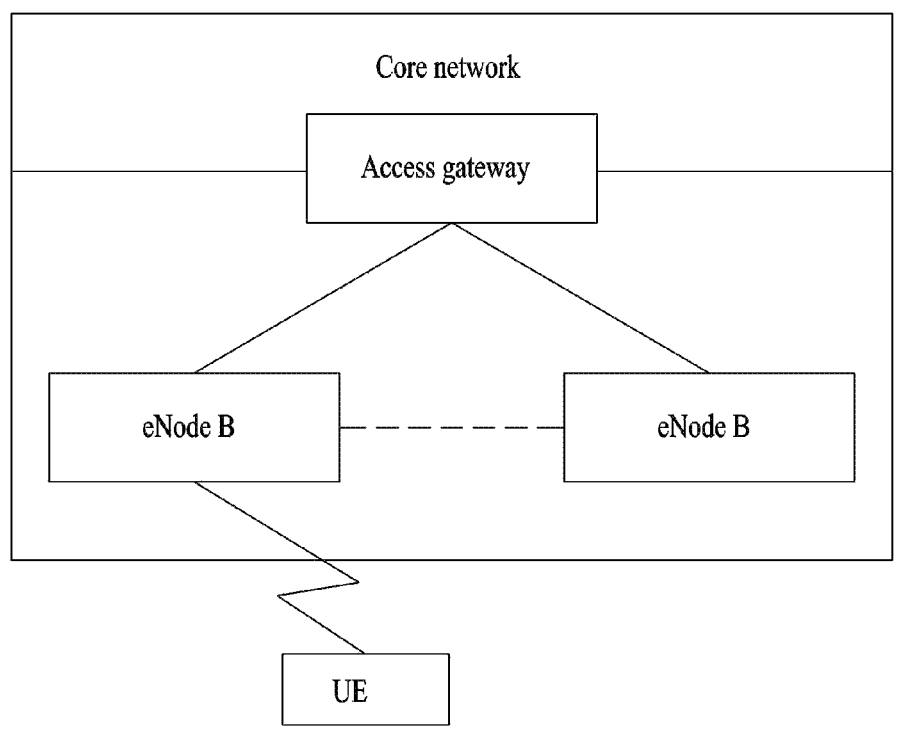
FIG. 1 is a diagram schematically illustrating a network structure of an evolved universal mobile telecommunication system (E-UMTS) as an exemplary radio communication system.

The configuration, operation and other features of the present invention will be understood by the embodiments of the present invention described with reference to the accompanying drawings. The following embodiments are examples of applying the technical features of the present invention to a 3rd Generation Partnership Project (3GPP) system.

Although the embodiments of the present invention will be described based on an LTE system and an LTE-advanced (LTE-A) system, the LTE system and the LTE-A system are purely exemplary and the embodiments of the present invention can be applied to any communication system corresponding to the aforementioned definition. Moreover, although the present specification describes an embodiment of the present invention with reference to FDD system, this is just exemplary. And, the embodiments of the present invention can be applied to H-FDD or TDD system by being easily modified.

In the present disclosure, a base station (eNB) may be used as a broad meaning including a remote radio head (RRH), an eNB, a transmission point (TP), a reception point (RP), a relay, etc.

FIG. 2 is a diagram illustrating structures of a control plane and a user plane of a radio interface protocol between a UE and an E-UTRAN based on 3GPP radio access network specifications. The control plane refers to a path used for transmission of control messages, which is used by the UE and the network to manage a call. The user plane refers to a path in which data generated in an application layer, e.g. voice data or Internet packet data, is transmitted.

A physical layer of a first layer provides an information transfer service to an upper layer using a physical channel. The physical layer is connected to a media access control (MAC) layer of an upper layer via a transmission channel Data is transmitted between the MAC layer and the physical layer via the transmission channel Data is also transmitted between a physical layer of a transmitter and a physical layer of a receiver via a physical channel. The physical channel uses time and frequency as radio resources. Specifically, the physical channel is modulated using an orthogonal frequency division multiple Access (OFDMA) scheme in DL and is modulated using a single-carrier frequency division multiple access (SC-FDMA) scheme in UL.

The MAC layer of a second layer provides a service to a radio link control (RLC) layer of an upper layer via a logical channel. The RLC layer of the second layer supports reliable data transmission. The function of the RLC layer may be implemented by a functional block within the MAC layer. A packet data convergence protocol (PDCP) layer of the second layer performs a header compression function to reduce unnecessary control information for efficient transmission of an Internet protocol (IP) packet such as an IPv4 or IPv6 packet in a radio interface having a relatively narrow bandwidth.

A radio resource control (RRC) layer located at the bottommost portion of a third layer is defined only in the control plane. The RRC layer controls logical channels, transmission channels, and physical channels in relation to configuration, re-configuration, and release of radio bearers. A radio bearer refers to a service provided by the second layer to transmit data between the UE and the network. To this end, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A non-access stratum (NAS) layer located at an upper level of the RRC layer performs functions such as session management and mobility management.

A cell constructing an eNB is configured by one of bandwidths among 1.25, 2.5, 5, 10, 15, and 20 MHz and provides DL or UL transmission service to a plurality of UEs. Cells different from each other can be configured to provide a different bandwidth.

DL transmission channels for data transmission from the network to the UE include a broadcast channel (BCH) for transmitting system information, a paging channel (PCH) for transmitting paging messages, and a DL shared channel (SCH) for transmitting user traffic or control messages. Traffic or control messages of a DL multicast or broadcast service may be transmitted through the DL SCH or may be transmitted through an additional DL multicast channel (MCH). Meanwhile, UL transmission channels for data transmission from the UE to the network include a random access channel (RACH) for transmitting initial control messages and a UL SCH for transmitting user traffic or control messages. Logical channels, which are located at an upper level of the transmission channels and are mapped to the transmission channels, include a broadcast control channel (BCCH), a paging control channel (PCCH), a common control channel (CCCH), a multicast control channel (MCCH), and a multicast traffic channel (MTCH).

Figure 3:
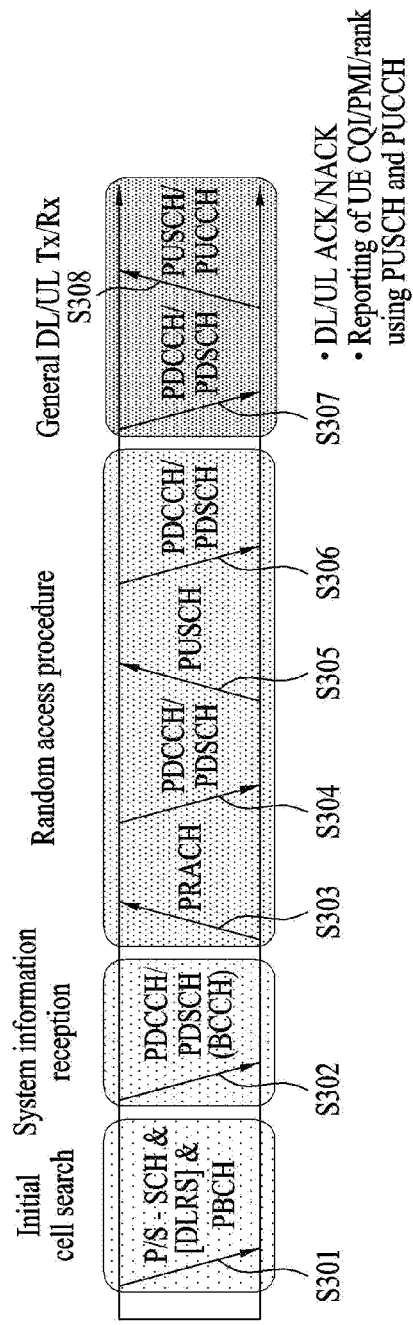
FIG. 3 is a diagram illustrating physical channels used in a 3GPP system and a general signal transmission method using the same.

FIG. 3 is a diagram illustrating physical channels used in a 3GPP system and a general signal transmission method using the same.

When power is turned on or the UE enters a new cell, the UE performs an initial cell search procedure such as acquisition of synchronization with an eNB (S301). To this end, the UE may adjust synchronization with the eNB by receiving a primary synchronization channel (P-SCH) and a secondary synchronization channel (S-SCH) from the eNB and acquire information such as a cell identity (ID). Thereafter, the UE may acquire broadcast information within the cell by receiving a physical broadcast channel from the eNB. In the initial cell search procedure, the UE may monitor a DL channel state by receiving a downlink reference signal (DL RS).

Upon completion of the initial cell search procedure, the UE may acquire more detailed system information by receiving a physical downlink control channel (PDCCH) and receiving a physical downlink shared channel (PDSCH) based on information carried on the PDCCH (S302).

Meanwhile, if the UE initially accesses the eNB or if radio resources for signal transmission to the eNB are not present, the UE may perform a random access procedure (S303 to S306) with the eNB. To this end, the UE may transmit a specific sequence through a physical random access channel (PRACH) as a preamble (S303 and S305) and receive a response message to the preamble through the PDCCH and the PDSCH associated with the PDCCH (S304 and S306). In the case of a contention-based random access procedure, the UE may additionally perform a contention resolution procedure.

After performing the above procedures, the UE may receive a PDCCH/PDSCH (S307) and transmit a physical uplink shared channel (PUSCH)/physical uplink control channel (PUCCH) (S308), as a general UL/DL signal transmission procedure. Especially, the UE receives downlink control information (DCI) through the PDCCH. The DCI includes control information such as resource allocation information for the UE and has different formats according to use purpose thereof.

Meanwhile, control information that the UE transmits to the eNB on UL or receives from the eNB on DL includes a DL/UL acknowledgment/negative acknowledgment (ACK/NACK) signal, a channel quality indicator (CQI), a precoding matrix index (PMI), a rank indicator (RI), and the like.

In the 3GPP LTE system, the UE may transmit the control information such as CQI/PMI/RI through a PUSCH and/or a PUCCH.

Figure 4:
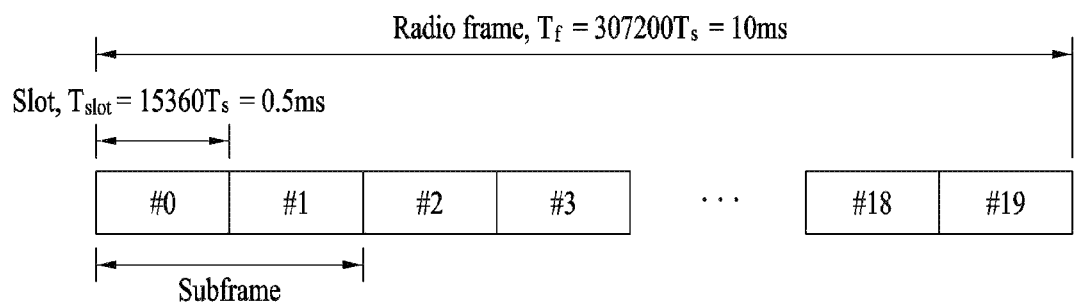
FIG. 4 is a diagram illustrating the structure of a radio frame used in a long term evolution (LTE) system.

FIG. 4 is a diagram illustrating the structure of a radio frame used in an LTE system.

Referring to FIG. 4, the radio frame has a length of 10 ms ($327200 \times T_s$) and includes 10 equal-sized subframes. Each of the subframes has a length of 1 ms and includes two slots. Each slot has a length of 0.5 ms (15360 Ts). In this case, Ts denotes a sampling time represented by $T_s=1/(15 \text{ kHz} \times 2048)=3.2552 \times 10-8$ (about 33 ns). Each slot includes a plurality of OFDM symbols in the time domain and includes a plurality of resource blocks (RBs) in the frequency domain. In the LTE system, one RB includes 12 subcarriers×7 (or 6) OFDM symbols. A transmission time interval (TTI), which is a unit time for data transmission, may be determined in units of one or more subframes. The above-described structure of the radio frame is purely exemplary and various modifications may be made in the number of subframes included in a radio frame, the number of slots included in a subframe, or the number of OFDM symbols included in a slot.

Figure 5:
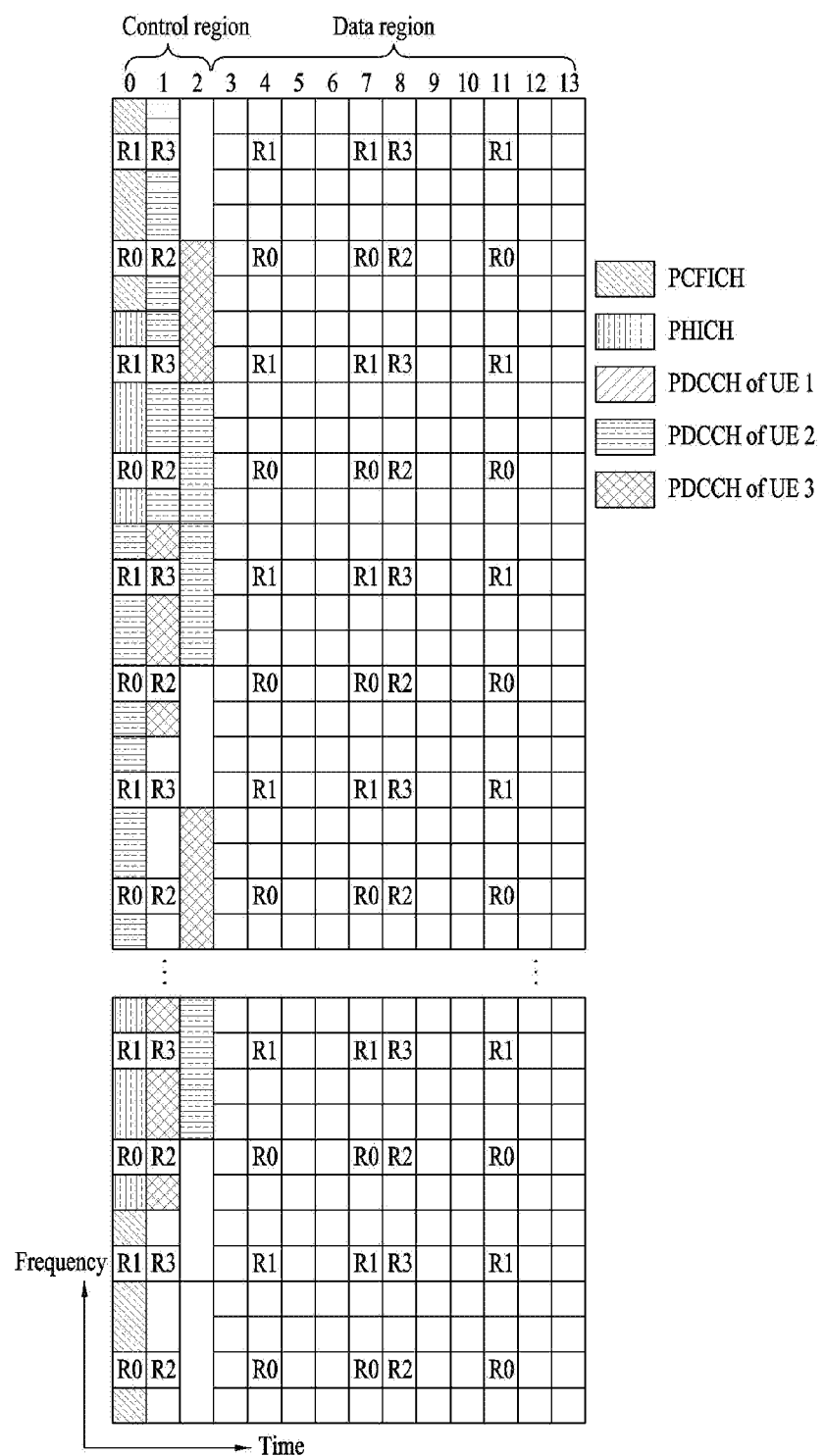
FIG. 5 is a diagram illustrating the structure of a DL radio frame used in an LTE system.

FIG. 5 is a diagram illustrating control channels included in a control region of one subframe in a DL radio frame.

Referring to FIG. 5, one subframe includes 14 OFDM symbols. The first to third ones of the 14 OFDM symbols may be used as a control region and the remaining 11 to 13 OFDM symbols may be used as a data region, according to subframe configuration. In FIG. 5, R0 to R3 represent reference signals (RSs) or pilot signals for antennas 0 to 3, respectively. The RSs are fixed to a predetermined pattern within the subframe irrespective of the control region and the data region. Control channels are allocated to resources unused for RSs in the control region. Traffic channels are allocated to resources unused for RSs in the data region. The control channels allocated to the control region include a physical control format indicator channel (PCFICH), a physical hybrid-ARQ indicator channel (PHICH), a physical downlink control channel (PDCCH), etc.

The PCFICH, physical control format indicator channel, informs a UE of the number of OFDM symbols used for the PDCCH in every subframe. The PCFICH is located in the first OFDM symbol and is configured with priority over the PHICH and the PDCCH. The PCFICH is composed of 4 resource element groups (REGs) and each of the REGs is distributed over the control region based on a cell ID. One REG includes 4 resource elements (REs). An RE indicates a minimum physical resource defined as one subcarrier by one OFDM symbol. The PCFICH value indicates values of 1 to 3 or values of 2 to 4 depending on bandwidth and is modulated using quadrature phase shift keying (QPSK).

The PHICH, physical hybrid-ARQ indicator channel, is used to carry a HARQ ACK/NACK signal for UL transmission. That is, the PHICH indicates a channel through which DL ACK/NACK information for UL HARQ is transmitted. The PHICH includes one REG and is cell-specifically scrambled. The ACK/NACK signal is indicated by 1 bit and is modulated using binary phase shift keying (BPSK). The modulated ACK/NACK signal is spread with a spreading factor (SF) of 2 or 4. A plurality of PHICHs mapped to the same resource constitutes a PHICH group. The number of PHICHs multiplexed to the PHICH group is determined depending on the number of spreading codes. The PHICH (group) is repeated three times to obtain diversity gain in the frequency domain and/or the time domain.

The PDCCH is allocated to the first n OFDM symbols of a subframe. In this case, n is an integer equal to or greater than 1, indicated by the PCFICH. The PDCCH is composed of one or more control channel elements (CCEs). The PDCCH informs each UE or UE group of information associated with resource allocation of transmission channels, that is, a paging channel (PCH) and a downlink shared channel (DL-SCH), UL scheduling grant, HARQ information, etc. The PCH and the DL-SCH are transmitted through a PDSCH. Therefore, the eNB and the UE transmit and receive data through the PDSCH except for particular control information or service data.

Information indicating to which UE or UEs PDSCH data is to be transmitted and information indicating how UEs should receive and decode the PDSCH data are transmitted on the PDCCH. For example, assuming that a cyclic redundancy check (CRC) of a specific PDCCH is masked by a radio network temporary identity (RNTI) 'A' and information about data transmitted using a radio resource 'B' (e.g. frequency location) and using DCI format 'C', i.e. transport format information (e.g. a transport block size, a modulation scheme, coding information, etc.), is transmitted in a specific subframe, a UE located in a cell monitors the PDCCH, i.e. blind-decodes the PDCCH, using RNTI information thereof in a search space. If one or more UEs having RNTI 'A' are present, the UEs receive the PDCCH and receive a PDSCH indicated by 'B' and 'C' based on the received information of the PDCCH.

Figure 6:
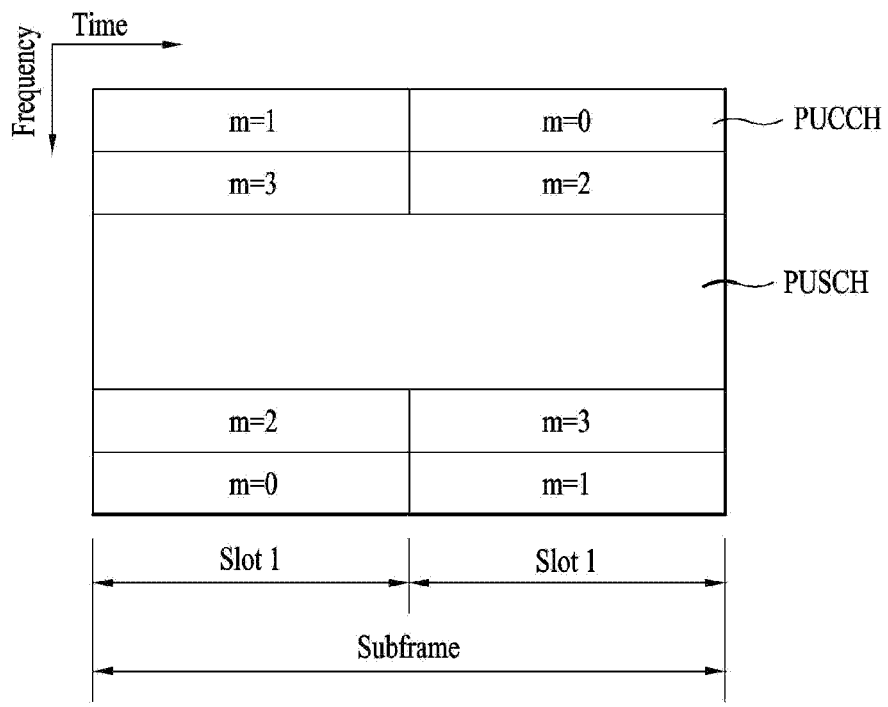
FIG. 6 is a diagram illustrating the structure of a UL subframe in an LTE system.

FIG. 6 is a diagram illustrating the structure of a UL subframe in an LTE system.

Referring to FIG. 6, an uplink subframe is divided into a region to which a PUCCH is allocated to transmit control information and a region to which a PUSCH is allocated to transmit user data. The PUSCH is allocated to the middle of the subframe, whereas the PUCCH is allocated to both ends of a data region in the frequency domain. The control information transmitted on the PUCCH includes an ACK/NACK, a channel quality indicator (CQI) representing a downlink channel state, an RI for Multiple Input and Multiple Output (MIMO), a scheduling request (SR) indicating a request for allocation of UL resources, etc. A PUCCH of a UE uses one RB occupying different frequencies in each slot of a subframe. That is, two RBs allocated to the PUCCH frequency-hop over the slot boundary. Particularly, PUCCHs for m=0, m=1, m=2, and m=3 are allocated to a subframe in FIG. 6.

Figure 7:
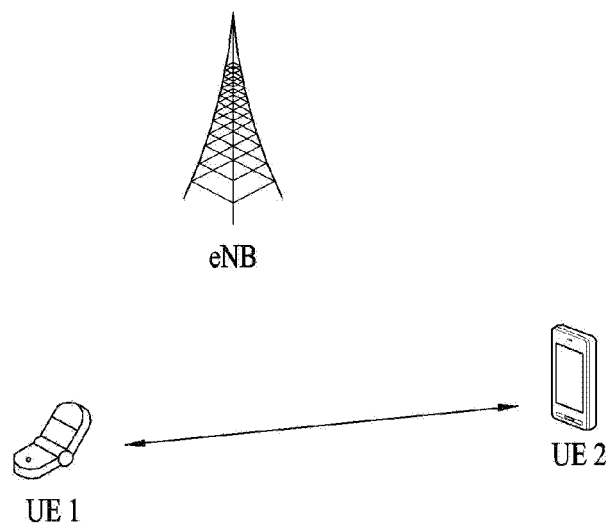
FIG. 7 is a diagram illustrating the concept of device-to-device (D2D) communication.

FIG. 7 is a diagram illustrating the concept of device-to-device (D2D) communication.

Referring to FIG. 7, during D2D communication (i.e., D2D direct communication) in which a UE wirelessly communicates with another UE, an eNB may transmit a scheduling message for indicating D2D transmission/reception. In the following description, a direct link established between UEs for direct communication therebetween, i.e., a D2D link is referred to as a Sidelink (SL) as the concept opposite to an uplink and a downlink.

A UE participating in sidelink communication receives a sidelink scheduling message from an eNB and perform transmission and reception operation indicated by the sidelink scheduling message. Here, although a UE means a user terminal, a network entity such as an eNB can be regarded as kind of a UE if the network entity transmits/receives signals according to a communication scheme between UEs. In addition, an eNB can receive a sidelink signal transmitted from a UE, and a UE can use a signal transmission and reception method designed for sidelink communication between UEs to transmit an uplink signal to an eNB.

For sidelink communication, a UE performs a discovery process for determining whether a peer UE, which the UE desires to communicate with, is in an adjacent area where the sidelink communication is possible. The discovery process is performed as follows. First, a UE transmits a unique discovery signal that allows other UEs to identify the corresponding UE. By detecting the discovery signal, a neighboring UE can recognize that the UE transmitting the discovery signal is located in the vicinity thereof. That is, after checking whether a peer UE corresponding to a sidelink communication target is located in the vicinity thereof through the discovery process, each UE performs sidelink communication, that is, transmits and receives user data to and from the peer UE.

Meanwhile, described in the following is a case that a UE 1 selects a resource unit corresponding to a specific resource from a resource pool that means a set of a series of resources and then transmits a sidelink signal using the corresponding resource unit. Here, if the UE 1 is located in a coverage of a base station, the base station may inform the UE 1 of the resource pool. If the UE 1 is out of the coverage of the base station, the resource pool may be indicated by another UE or determined as a resource determined in advance. Generally, a resource pool is configured with a plurality of resource units and each UE may select and use one or a plurality of resource units for a sidelink signal transmission of its own.

Figure 8:
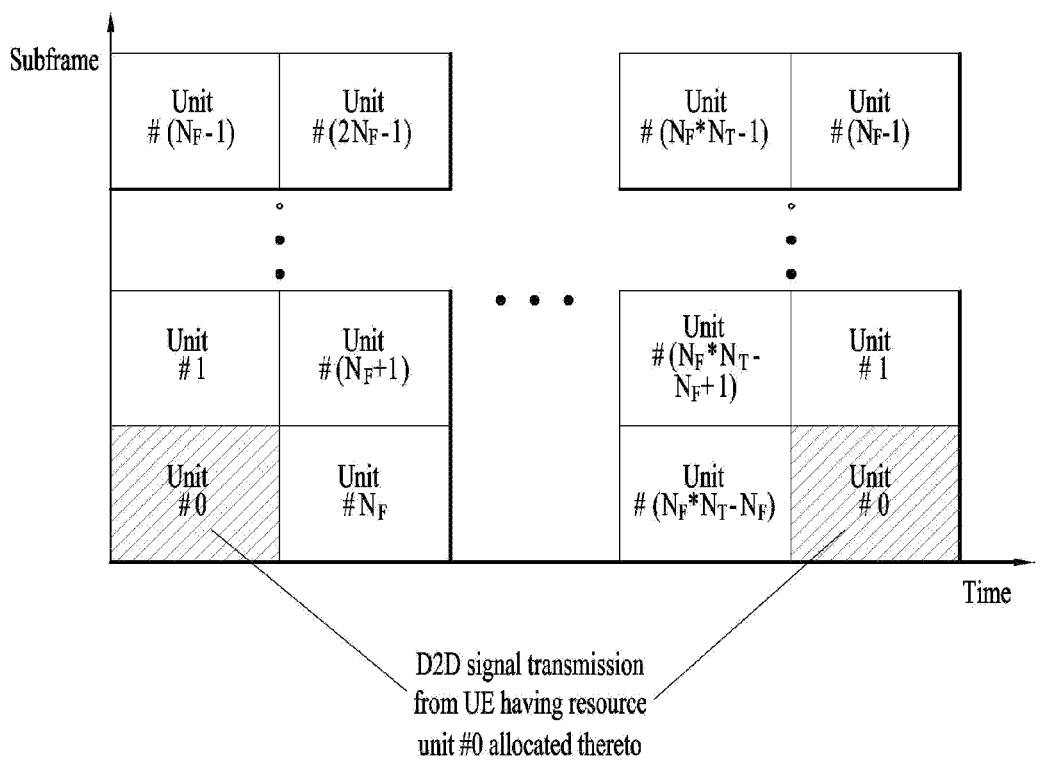
FIG. 8 illustrates an exemplary configuration of a resource pool and a resource unit.

FIG. 8 shows a configurational example of a resource pool and a resource unit.

Referring to FIG. 8, an entire frequency resource is divided into NF and an entire time resource is divided into NT, whereby total NF*NT resource units are defined for example. Particularly, a corresponding resource pool may be repeated by period of NT subframes. Typically, a single resource unit may appear periodically and repeatedly. Or, in order to obtain a diversity effect in a time or frequency dimension, an index of a physical resource unit having a single logical resource unit mapped thereto may change in a previously determined pattern according to time. In such a resource unit structure, a resource pool may mean a set of resource units that can be used for a transmission by a UE intending to transmit a sidelink signal.

The above-described resource pool may be subdivided into various types. First of all, it can be classified according to a content of a sidelink signal transmitted on a resource pool. For example, like 1) to 3) in the following, a content of a sidelink signal may be classified into a sidelink data channel and a discovery signal. And, a separate resource pool may be configured according to each content.

1) SA (Scheduling assignment): An SA refers to a signal including resource location information of a sidelink data channel, information on a Modulation and Coding Scheme (MCS) for demodulation of the sidelink data channel, information on a MIMO transmission scheme, etc., which is provided by a transmitting UE. The SA can be multiplexed with sidelink data and then transmitted together with the sidelink data on the same resource unit. In this case, an SA resource pool may mean a resource pool in which the SA is multiplexed and transmitted with the sidelink data.

2) Sidelink data channel: This refers to a channel used for a transmitting UE to transmit user data. If SA is transmitted by being multiplexed with sidelink data on a same resource unit, a Resource Element (RE) used in transmitting SA information on a specific resource unit of an SA resource pool may be used to transmit sidelink data on a sidelink data channel resource pool.

3) Discovery signal: This means a resource pool for a signal enabling a neighboring UE to discover a transmitting UE in such a manner that the transmitting UE transmits information such as its own ID and the like.

4) Synchronization signal: A transmitting UE transmits a synchronization signal and information on synchronization so that a receiving UE can achieve time/frequency synchronization with the transmitting UE. In this case, it could be interpreted to mean a resource pool for the signal/channel used by the receiving UE to achieve the time/frequency synchronization.

As more and more communication devices require a larger communication capacity, there is a need for mobile broadband communication enhanced over conventional radio access technology (RAT). In addition, massive machine type communications (MTC) capable of providing a variety of services anywhere and anytime by connecting multiple devices and objects is another important issue to be addressed for next generation communications. A communication system design considering services/UEs sensitive to reliability and latency is also under discussion. As such, introduction of new radio access technology considering enhanced mobile broadband communication (eMBB), massive MTC, and ultra-reliable and low latency communication (URLLC) is being discussed. In the present disclosure, for simplicity, this technology will be referred to as NR (or New RAT).

In massive MIMO, if one transceiver unit (TXRU) per antenna element is provided to enable transmission power control and phase control on an antenna element basis for the purpose of maximizing a performance gain, independent beamforming per frequency resource is possible. However, installation of a TXRU for every antenna element is not practical in real implementation. In this context, a method of mapping a plurality of antenna elements to one TXRU and controlling a beam direction by an analog phase shifter is under discussion in NR. In analog beamforming, however, only one beam direction may be formed in each time instance such as a symbol or a subframe, and inaccurate beam association between a transmission (Tx) beam and a reception (Rx) beam may lead to serious performance degradation, which will be described with reference to the drawings.

Figure 9:
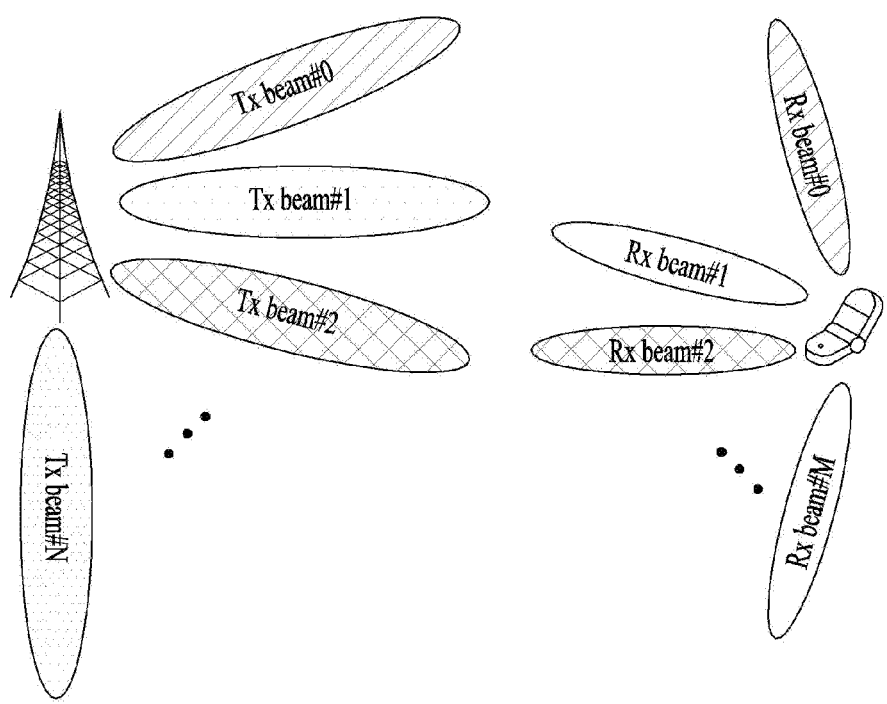
FIG. 9 illustrates an exemplary configuration of transmission (Tx) beams of an evolved Node B (eNB) and reception (Rx) beams of a user equipment (UE).

FIG. 9 illustrates an exemplary configuration of Tx beams of an eNB and Rx beams of a UE. Particularly in FIG. 9, it is assumed that the eNB may configure N Tx (analog) beams, the UE may configure M Rx (analog) beams, and when the UE receives a signal on beam pairs, (Tx beam #1-Rx beam #1) and (Tx beam #2-Rx beam #2), the best reception performance is achieved. A signal transmitted on Tx beam #2 may experience reception performance degradation on an Rx beam other than Rx beam #2 paired with Tx beam #2.

Considering a millimeter wave (mmWave) channel environment and the mobility of the UE, the decreased communication reliability caused by the beam misalignment may become serious. Specifically, it may occur that the UE moves to another location, is rotated, or is placed in a changed radio channel environment due to movement of a neighboring object (e.g., the UE switches from a line of sight (LoS) environment to a non-LoS environment in view of beam blockage). Although the best DL/UL/UL beam pair may then be changed, compensation of DL/UL/UL beam in each CSI reporting instance or at each transmission time results in an excessive increase in RS overhead and signaling overhead, and it is not preferable in terms of power consumption of the UE and the eNB to perform a beam pair decision process too many times. Accordingly, there is a need for a retransmission scheme which ensures communication reliability, while avoiding beam pair reselection if possible.

Considering an embodiment such as platooning in vehicle-to-everything (V2X), a technique for compensating for a possible reliability decrease caused by beam misalignment in a groupcast/multicast environment in which the same information is transmitted to a specific UE group is also required. More specifically, when a transmitting UE (or network) transmits specific data on a multicast channel, some of receiving UEs may fail in receiving the data. Particularly, if the data is so important as to be received with a high probability, the transmitting UE should retransmit the data to enable the receiving UEs to receive the data successfully. Although the multicast channel may be used again in the retransmission, for error correction of the multicast data, the retransmission may not be optimized for the situations of individual receiving UEs. Particularly, for individual UEs which have failed in data decoding due to their poor channel states, transmission may not be performed with an optimized precoding or modulation and coding scheme (MCS) configuration or a neighbor cell interference mitigation technique.

In the present disclosure, a method of precoding retransmission data based on RS measurement in direct communication between UEs (or within a UE group) is proposed. More specifically, a transmitting UE enables a receiving UE to perform channel estimation by transmitting an RS for channel measurement or beam measurement for each of ports of the transmitting UE along with data during an initial multicast/unicast transmission, and the receiving UE determines a precoder for HARQ retransmission based on measured channel information and feeds back the precoder to the transmitting UE. Subsequently, the transmitting UE applies precoding based on the feedback precoder and performs a retransmission.

More specifically, the present disclosure may (1) enable a transmitting UE to efficiently retransmit multicast data of which the decoding has failed by using a precoding or MCS level optimum for the channel state of an individual receiving UE, in consideration of V2X implementation for communication between vehicle UEs, and (2) increase communication reliability by performing a retransmission which reflects the channel state of an individual receiving UE in an environment in which beam misalignment may occur instantaneously, such as an mmWave band.

For the convenience, a UE (or an eNB) which performs data retransmission is referred to as a transmitting UE, and a UE which feeds back an ACK/NACK in response to data reception is referred to as a receiving UE in the present disclosure.

Embodiment 1

A transmitting UE may enable receiving UE(s) to acquire transmitting UE-receiving UE channel (or beam) information by transmitting an RS (e.g., channel state information-reference signal (CSI-RS)) for channel (or beam) measurement per port of the transmitting UE along with data during an initial multicast/unicast transmission. The transmitting UE may transmit an RS per port of the transmitting UE during the initial transmission by method 1) in which an RS (e.g., a demodulation RS (DM-RS) in the LTE system) subjected to the same precoding as data is transmitted along with the data or method 2) in which an RS (e.g., a CSI-RS in the LTE system) subjected to different precoding from that of data is transmitted along with the data.

Figure 10:
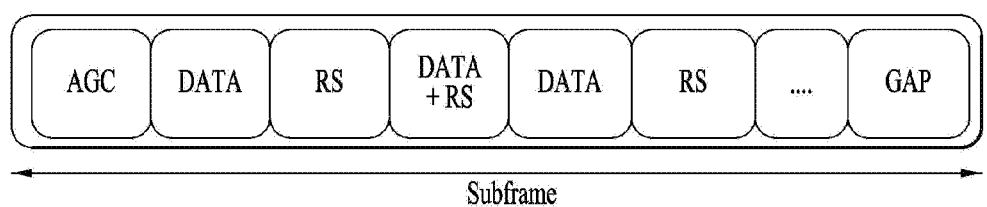
FIGS. 10 and 11 illustrate exemplary frame structures for transmitting a reference signal (RS) subjected to the same precoding as data according to an embodiment of the present disclosure.
Figure 11:
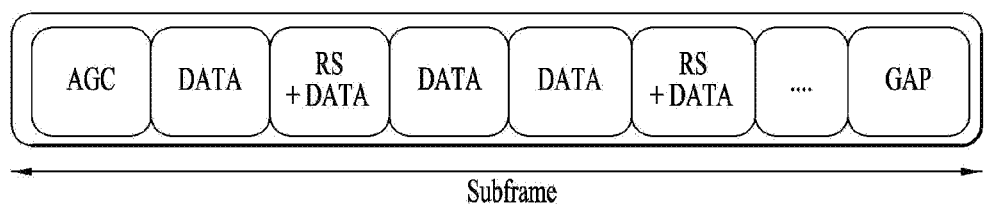

When an RS subjected to the same precoding as data is transmitted as in method 1), the RS and the data are transmitted on the same beam at the same time point. For the proposed technique, frame structures as illustrated in FIGS. 10 and 11 may be considered. FIGS. 10 and 11 illustrate exemplary frame structures for transmitting an RS subjected to the same precoding as data according to an embodiment of the present disclosure.

Referring to FIG. 10, a DM-RS and data may be transmitted in frequency division multiplexing (FDM) in all or a part of legacy data transmission symbols. Referring to FIG. 11, transmission of an RS and data in FDM in legacy RS transmission symbols may also be considered. Particularly in the illustrated case of FIG. 11, a port for transmission of a scheduling assignment (SA) which is control information, a data transmission port, a port for transmission of an RS corresponding to the SA, and a port for transmitting of an RS corresponding to data are all the same.

On the other hand, when the transmitting UE transmits an RS subjected to precoding independent of that of data as in method 2), the RS and the data may be transmitted on different beams at the same or different time points. For example, the transmitting UE may form only one analog beam at one time point and transmit the data and the RS on different analog beams at different time points (e.g., in different symbols). This operation will be described with reference to the drawings.

Figure 12:
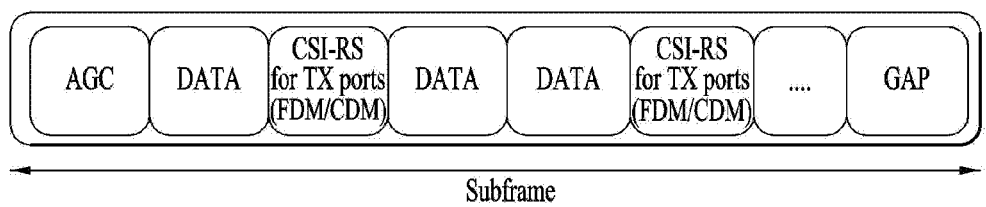
FIGS. 12, 13 and 14 illustrate exemplary frame structures for transmitting an RS subjected to different precoding from that applied to data according to an embodiment of the present disclosure.
Figure 13:
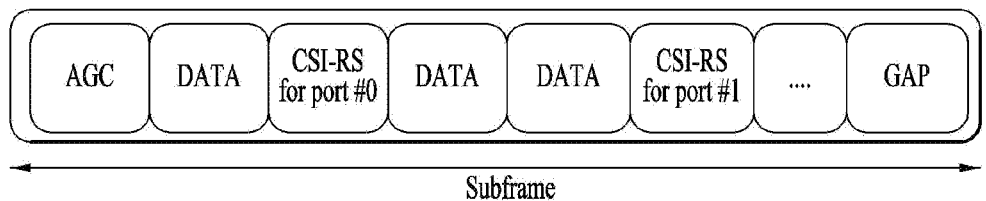
Figure 14:
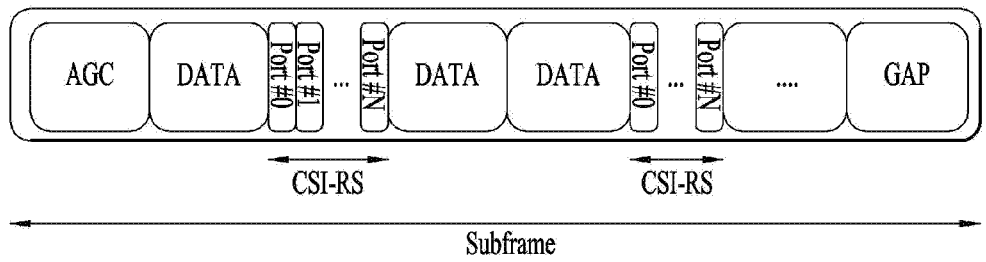

FIGS. 12, 13 and 14 illustrate exemplary frame structures for transmitting an RS subjected to different precoding from that of data according to an embodiment of the present disclosure.

Referring to FIG. 12, a transmitting UE may transmit CSI-RSs for respective Tx ports in FDM or code division multiplexing (CDM) in a legacy RS transmission symbol. In another example, a frame structure is also available, in which CSI-RSs of different ports are transmitted in a plurality of respective RS transmission symbols as illustrated in FIG. 13. Further, as illustrated in FIG. 14, CSI-RSs may be transmitted in TDM in one symbol period. Particularly, in consideration of analog beamforming in the mmWave band, one symbol period may be divided into a plurality of periods by applying a relatively large subcarrier spacing within one symbol, and CSI-RSs may be transmitted on different analog beams in TDM in the plurality of periods.

For reference, an automatic gain control (AGC) period may be defined to reduce an average power variation caused by signal transmission times varying in each subframe in FIGS. 10 to 14. Because a UE transmits a signal directly in V2X communication, signal transmission time/frequency resources or the like may change in each subframe. Specifically, while the use of a periodically transmitted cell-specific reference signal (CRS) obviates the need for an additional AGC period in legacy cellular communication, an AGC period is defined at the start of signal transmission, for example, in a first symbol in V2X communication because a repeatedly transmitted RS is not considered. Further, in FIGS. 10 to 14, GAP represents a gap symbol which is a period for ensuring Tx/Rx switching.

An SA Tx port, a data Tx port, and an RS port corresponding to an SA may be the same, while only a CSI-RS Tx port for data transmission is different. For example, for data demodulation based on a CSI-RS, an SA may need to indicate precoding information applied to the CSI-RS. It may be reasonable to transmit a DM-RS as an RS for the SA, and only an RS for data transmission may be transmitted as a CSI-RS.

Further, the transmitting UE may enable a receiving UE to acquire channel information for port(s) transmitted by the transmitting UE by indicating precoder information or a transmission scheme (e.g., spatial time block coding (STBC)) used in RS beamforming for the SA, and/or an RI. The receiving UE may then feed back a precoder or beam selection information for a retransmission based on the channel information.

The present disclosure is described in the context of an LTE frame structure for the convenience of description, which should not be construed as limiting. The transmission order or number of transmissions of data and an RS may be changed.

Embodiment 2

Receiving UE(s) may determine a preferred precoder (or beam) for a retransmission by measuring a channel from a transmitting UE to the receiving UE(s) based on an RS transmitted by the transmitting UE, and transmit corresponding precoder (or beam) information along with an ACK/NACK response to the transmitting UE.

The receiving UE(s) may calculate and determine precoding in the following methods.

When the transmitting UE transmits RSs subjected to the same precoding as data, the receiving UEs may measure channels based on the RSs transmitted by the transmitting UE, and calculate precoding, assuming rank 1 for the ports of the RSs.

When the transmitting UE transmits RSs subjected to different precoding from that of data, the receiving UE(s) measures channels based on the RSs of ports transmitted by the transmitting UE, assuming a preset precoder or a precoder applied to an RS, indicated through an SA by the transmitting UE. That is, the receiving UE(s) may calculate precoding based on channels of RS ports, not based on a received data channel. Further, the receiving UE(s) may calculate precoding on the assumption of rank 1 for the RS ports, and select corresponding precoding from a preconfigured (preset) codebook.

Further, preferred precoder (or beam) information for a retransmission, acquired by an individual receiving UE may be transmitted along with an ACK/NACK response. The receiving UE may feed back the precoder or beam information determined to be suitable for the retransmission in the form of a specific sequence or bit stream to the transmitting UE. In this case, although beam accuracy for a retransmission may be increased, the number of precoders or the number of sequences required for a beam resolution, or a bit size required to represent a precoder or a sequence may be increased.

To avert the above problem, when selecting a preferred Tx beam for a retransmission, the receiving UE may select the specific preferred Tx beam from a preset specific precoder (beam) set and feed back the selected Tx beam. When the receiving UE succeeds at least in SA decoding but fails in data decoding, and thus transmits a NACK, it may be expected that there is no significant beam change between an initial transmission time and a retransmission. Accordingly, the receiving UE is highly probable to select a preferred retransmission Tx beam from among beams adjacent to a precoder (beam) indicated by the transmitting UE. The resulting decrease in the size of a candidate beam set may lead to reduction of feedback overhead.

Figure 15:
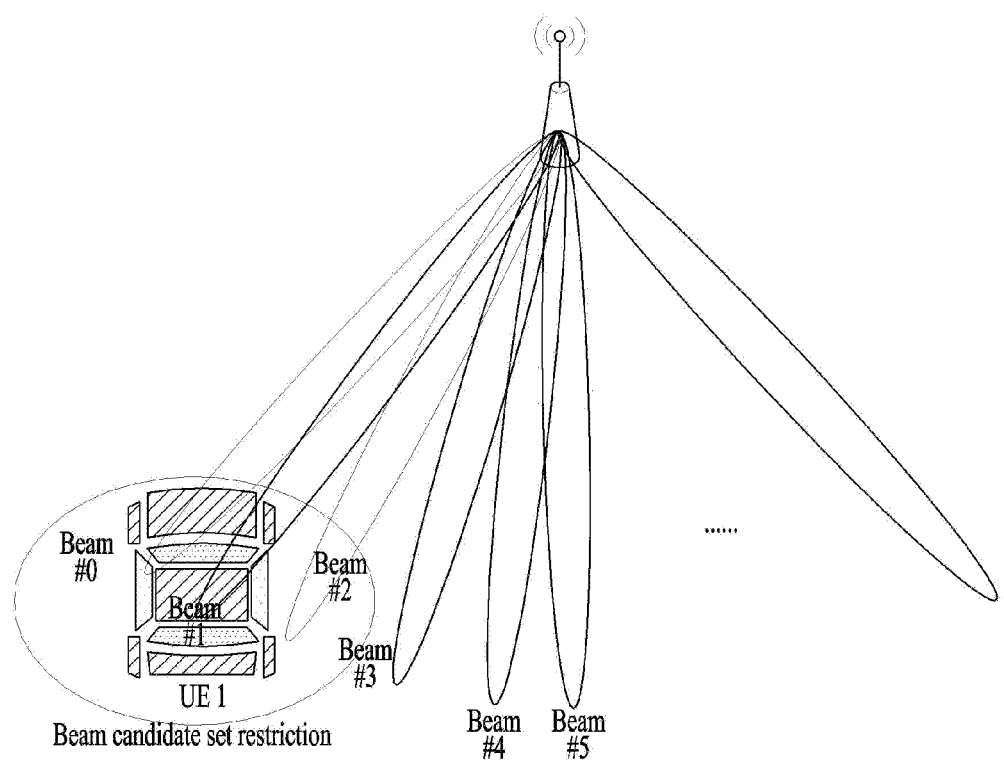
FIG. 15 illustrates an example in which a receiving UE selects a preferred Tx beam according to an embodiment of the present disclosure.

FIG. 15 illustrates an example in which a receiving UE selects a preferred Tx beam or a beam candidate set based on a specific criterion according to an embodiment of the present disclosure. Particularly, FIG. 15 is based on the assumption that beam #0, beam #1 and beam #2 are adjacent in a situation in which Tx beam #0 to Tx beam #8 exist.

In this case, a beam candidate set including beam #0, beam #1 and beam #2 is configured as a precoder set which is available to the receiving UE, based on the proximity between the transmitting UE and the receiving UE. When the receiving UE receives data on beam #1, the receiving UE may just determine which one between beam #0 and beam #2 is better for a retransmission in the beam candidate set or whether beam #1 is still to be used for the retransmission, with no regard given to beam #3 to beam #8 which are not included in the beam candidate set. Although the beams of a beam candidate set have been selected based on proximity in the above example, the beam selection criterion is not limited to proximity.

Further, the receiving UE may feed back a plurality of Tx beam candidate sets for a retransmission to the transmitting UE, and the transmitting UE may select at least one of a plurality of beam candidates, and perform a single retransmission or repeated retransmissions by using the selected beam candidate. Further, the transmitting UE may use a different Tx beam width for a retransmission from a beam width for an initial signal transmission. That is, the transmitting UE may perform a retransmission on as omnidirectional or broad a beam as possible.

Further, the receiving UE may also transmit, to the transmitting UE, an RI or information used for determining an MCS for the retransmission. For example, the receiving UE may determine a rank suitable for the retransmission based on a channel environment of a port, measured by the receiving UE, and indicate only a differential rank value explicitly to the transmitting UE. In another example, the receiving UE may provide the transmitting UE with information required to select an MCS suitable for the retransmission to the transmitting UE (or eNB) by transmitting channel quality information such as a CQI based on the channel measurement of the receiving UE along with an ACK/NACK.

Because the receiving UE does not have accurate information about a channel from the receiving UE to the transmitting UE (unless channel reciprocity is ensured), a Tx beam width for the ACK/NACK response may be different from the beam width used for the initial signal transmission. That is, the receiving may transmit the ACK/NACK response on as omni-directional or broad a beam as possible. In an alternative, the receiving UE may repeatedly transmit the ACK/NACK response by beam cycling.

Only when the ACK/NACK response transmitted along with the preferred retransmission precoder (beam) information by the receiving UE is NACK, the preferred retransmission precoder (beam) information may be meaningful in recommending/proposing retransmission precoding. If the ACK/NACK response is ACK, a field or sequence for a retransmission precoder (beam) may be omitted in the ACK/NACK response. If the field or sequence for a retransmission precoder (beam) is not omitted, the field or sequence may be used to propose a precoder (beam) for a transmission in a next period. The transmitting UE may be responsible for determining actual precoding for use in a retransmission based on the preferred retransmission precoder information fed back by the receiving UE(s), and a different precoding determination method may be performed according to UE implementation.

While an HARQ retransmission to groupcast/multicast UE(s) may be performed on a unicast channel with precoding and/or an MCS optimized for the characteristics of an individual UE channel (beam) determined in the above procedure, a retransmission may be performed on a multicast channel for receiving UEs to which NACK has occurred again despite the single precoding and/or MCS determined based on the individual UE channel by the transmitting UE.

While the proposed technique has been described on the assumption of a V2V scenario in the present disclosure, the proposed technique is applicable similarly to network-UE communication, not limited to V2V communication. Further, while the proposed technique has been described as a retransmission scheme for a multicast transmission, the proposed technique may also be applied to a retransmission scenario for a unicast transmission.

Further, while precoder update between an initial transmission and a retransmission has been described in the present disclosure, the precoder update may also be applied between a retransmission and the next retransmission in a similar manner. Further when channel reciprocity is ensured, the present disclosure is also applicable to the beamforming relationship between an initial transmission and an ACK/NACK response and/or precoder update between an ACK/NACK response and a retransmission. That is, when a receiving UE transmits a beamformed ACK/NACK, the receiving UE may determine precoding for the ACK/NACK response based on transmitting UE-receiving UE channel information measured during an initial data reception and transmit the beamformed ACK/NACK by applying the determined precoding. In a similar manner, as for an HARQ retransmission, a transmitting UE may be allowed to select a preferred Rx beam for the retransmission based on RS measurements of ports received along with an ACK/NACK response from the receiving UE.

Figure 16:
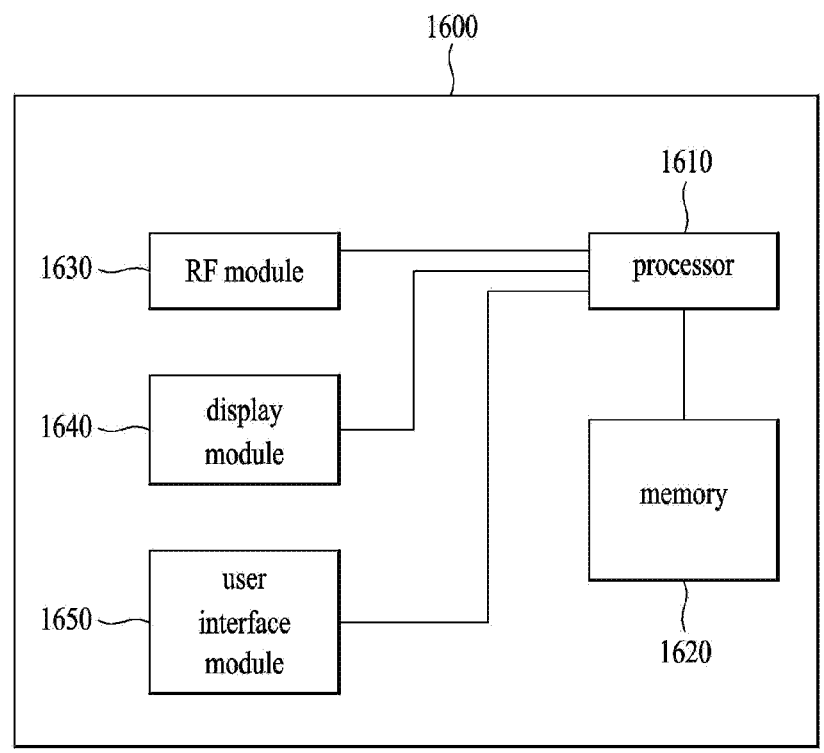
FIG. 16 is a block diagram illustrating a communication device according to the present disclosure.

FIG. 16 is a block diagram illustrating a communication device according to an embodiment of the present disclosure.

Referring to FIG. 16, a communication device 1600 may include a processor 1610, a memory 1620, a Radio Frequency (RF) module 1630, a display module 1640, and a user interface module 1650.

Since the communication device 1600 is illustrated for convenience of description, some of the modules may be omitted. If necessary, other modules may be further included in the communication device 1600. In some cases, some modules may be divided into sub-modules. The processor 1610 may be configured to perform the operations in accordance with the embodiments of the present invention, which are illustrated with the accompanying drawings. The operations of the processor 1610 are described in detail above with reference to FIGS. 1 to 15.

The memory 1620 is connected to the processor 1610 and stores operating systems, applications, program codes, data, etc. The RF module 1630 is connected to the processor 1610 and converts a baseband signal into a radio signal or vice versa. To this end, the RF module 1630 performs analog conversion, amplification, filtering, and frequency up-conversion, or inverse procedures thereof. The display module 1640 is connected to the processor 1610 and displays various information. The display module 1640 may be implemented using well-known elements such as a Liquid Crystal Display (LCD), a Light Emitting Diode (LED), and an Organic Light Emitting Diode (OLED). However, it is not limited thereto. The user interface module 1650 is connected to the processor 1610 and may be implemented by combining well-known user interfaces such as a keypad, a touchscreen, etc.

The above-mentioned embodiments correspond to combinations of elements and features of the present disclosure in prescribed forms. And, it is able to consider that the respective elements or features are selective unless they are explicitly mentioned. Each of the elements or features can be implemented in a form failing to be combined with other elements or features. Moreover, it is able to implement an embodiment of the present disclosure by combining elements and/or features together in part. A sequence of operations explained for each embodiment of the present disclosure can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

In this disclosure, a specific operation explained as performed by a base station may be performed by an upper node of the base station in some cases. In particular, in a network constructed with a plurality of network nodes including a base station, it is apparent that various operations performed for communication with a terminal can be performed by a base station or other networks other than the base station. 'Base station (BS)' may be substituted with such a terminology as a fixed station, a Node B, an eNode B (eNB), an access point (AP) and the like.

Embodiments of the present disclosure can be implemented using various means. For instance, embodiments of the present disclosure can be implemented using hardware, firmware, software and/or any combinations thereof. In case of the implementation by hardware, a method according to each embodiment of the present disclosure can be implemented by at least one of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present disclosure can be implemented by modules, procedures, and/or functions for performing the above-explained functions or operations. Software code is stored in a memory unit and is then drivable by a processor. The memory unit is provided within or outside the processor to exchange data with the processor through the various means known to the public.

It will be apparent to those skilled in the art that various modifications and variations can be made therein without departing from the spirit and scope of the disclosure. Therefore, the detailed description should not be interpreted restrictively in all aspects but considered as exemplary. Thus, it is intended that the present disclosure covers the modifications and variations of this disclosure that come within the scope of the appended claims and their equivalents.

INDUSTRIAL APPLICABILITY

While the method and apparatus for beam control for direct communication between UEs in a wireless communication system have been described in the context of a 3GPP LTE system, the method and apparatus are also applicable to various wireless communication systems other than the 3GPP LTE system.

The invention claimed is:

1. A method of transmitting data to a peer user equipment (UE) through direct communication between UEs by a UE in a wireless communication system, the method comprising:

transmitting, to the peer UE, a data signal and a plurality of reference signals related to a plurality of transmission beams in a frame including one or more data symbols and one or more reference signal symbols;

receiving, from the peer UE, a negative acknowledgment (NACK) for the data signal and information about a reference signal related to at least one preferred transmission beam among the plurality of transmission beams; and retransmitting, to the peer UE, the data signal precoded based on the preferred transmission beam, wherein the plurality of reference signals are multiplexed in time division multiplexing (TDM) in one reference signal symbol, and wherein precoders applied to the plurality of reference signals are different from a precoder applied to the data signal.

2. The method according to claim 1, wherein the transmission of the data signal and the plurality of reference signals comprises transmitting the data signal and the plurality of reference signals to the peer UE and one or more other UEs in a multicast scheme.

3. The method according to claim 1, wherein the plurality of reference signals are transmitted through different antenna ports.

4. The method according to claim 1, wherein the plurality of reference signals are time division multiplexed sequentially in order of antenna port indexes in one reference signal symbol.

5. The method according to claim 1,
wherein the at least one preferred transmission beam is selected from a beam candidate set including one or more of the plurality of transmission beams, and
wherein the beam candidate set is determined based on proximity between the UE and the peer UE.

6. A method of receiving data from a peer user equipment (UE) through direct communication between UEs by a UE in a wireless communication system, the method comprising:

receiving, from the peer UE, a data signal and a plurality of reference signals related to a plurality of transmission beams in a frame including one or more data symbols and one or more reference signal symbols;

transmitting, to the peer UE, a negative acknowledgment (NACK) for the data signal and information about a reference signal related to at least one preferred transmission beam among the plurality of transmission beams; and receiving, from the peer UE, the data signal precoded and retransmitted based on the preferred transmission beam, wherein the plurality of reference signals are multiplexed in time division multiplexing (TDM) in one reference signal symbol, and wherein precoders applied to the plurality of reference signals are different from a precoder applied to the data signal.

7. The method according to claim 6, wherein the data signal and the plurality of reference signals are transmitted to the peer UE and one or more other UEs in a multicast scheme.

8. The method according to claim 6, wherein the plurality of reference signals are transmitted through different antenna ports.

9. The method according to claim 6, wherein the plurality of reference signals are time division multiplexed sequentially in order of antenna port indexes in one reference signal symbol.

10. The method according to claim 6,
wherein the at least one preferred transmission beam is selected from a beam candidate set including one or more of the plurality of transmission beams, and
wherein the beam candidate set is determined based on proximity between the UE and the peer UE.

* * * * *